United States Patent [19]

Palatucci et al.

[11] Patent Number: 4,658,359
[45] Date of Patent: Apr. 14, 1987

[54] METHOD FOR MANAGING REDUNDANT RESOURCES IN A COMPLEX AVIONICS COMMUNICATION SYSTEM

[75] Inventors: Gerald J. Palatucci, Warminster, Pa.; Chester M. Nowicki, Lambertville, N.J.; Gordon B. Heal, Warminster, Pa.

[73] Assignee: The United States of America as represented by the Secretary of the Navy, Washington, D.C.

[21] Appl. No.: 688,126

[22] Filed: Dec. 31, 1984

[51] Int. Cl.⁴ .................................................. G06F 13/00
[52] U.S. Cl. .................................... 364/424; 364/900; 371/11
[58] Field of Search ...................... 364/424, 200, 900; 371/11

[56] References Cited

U.S. PATENT DOCUMENTS

| | | | |
|---|---|---|---|
| 4,370,708 | 1/1983 | Bruce et al. | 364/200 |
| 4,442,502 | 4/1984 | Friend et al. | 364/900 |
| 4,455,621 | 6/1984 | Pelley et al. | 364/900 |
| 4,484,273 | 11/1984 | Stiffler et al. | 364/200 |
| 4,562,532 | 12/1985 | Nishizawa et al. | 364/200 |
| 4,562,535 | 12/1985 | Vincent et al. | 364/200 |

Primary Examiner—Gary Chin
Attorney, Agent, or Firm—Robert F. Beers; Henry Hansen; Vincent T. Pace

[57] ABSTRACT

A digital computer based system for managing a plurality of redundant signal processing equipment in a complex avionics system provides fast reconfiguration of the signal processing equipment to add, delete, or modify signal processing functions. A single user may thereby control a very large number of signal processing functions for communication, navigation, and identification from a single input/output device. The system utilizes a data base thereby making additions or deletions of equipment easily achievable.

8 Claims, 19 Drawing Figures

- SYMBOLIC REPRESENTATION
- SHORT HAND REPRESENTATION

CHAIN RULE = 3,2,7,21
FOR UHF AM RECEIVE

POOL TABLE

|   |   |   |   |   |   |   |
|---|---|---|---|---|---|---|
| 1 | 1 | 0 | 0 |   |   |   |
|   |   |   |   |   |   |   |
| 7 | 1 | 0 | 0 | 0 |   |   |
|   |   |   |   |   |   |   |
|   |   |   |   |   |   |   |
| 36|   |   |   |   |   |   |

LEVEL 2

POOL STATUS
RESOURCE STATUS

0 = NO RESOURCE
1 = AVAILABLE
2 = IN CHRUB
3 = IN USE
4 = UNIT FAILED

|   |   |   |   |   |   |   |
|---|---|---|---|---|---|---|
| 1 | 1 | 0 | 0 |   |   |   |
|   |   |   |   |   |   |   |
| 7 |   |   |   |   |   |   |
|   |   |   |   |   |   |   |
|   |   |   |   |   |   |   |
| 36|   |   |   |   |   |   |

LEVEL 3

RESURCE WIRING KEYS

TYPE: Integer Numeric Array

FIG. 3B

ACTIVE MODES TABLE

| AMT COL | 1 | 2 | 3 | 4 | 5 | ... | 18 | 19 |
|---|---|---|---|---|---|---|---|---|
| 1 | 1 | 8 | 6 | 5 | 1 | . . . . . . . . . | 0 | 0 |
| 2 | 13 | 23 | 5 | 36 | 1 | . . . . . . . . . | 2 | 3 |
| 7 | | | | | | | | |

AMT ROW

- ASSIGN NUM
- MODE NUM
- PRIORITY
- 1st μP ADDRESS PRIMARY SECTION
- 8th μP ADDRESS PRIMARY SECTION

TYPE: Integer Numeric Array

RESOURCE DATA TABLE

| RDTCOL | 1 | 2 | 3 | 4 | 5 | 6 | 7 | 8 | 9 |
|---|---|---|---|---|---|---|---|---|---|
| 1 | 2 | 7 | 3 | 7 | 2 | 0 | 310 | 0 | 310 |
| 2 | 4 | 13 | 4 | 8 | 14 | 1 | 420 | 1 | 420 |

RES NUM

- PRIORITY
- POOL NUMBER
- ASSIGN NUM
- μP PRI ADDR
- μP SEC ADDR
- BIT INDICATOR
- BUS FREQ
- HUGHES / GD
- FIXED FREQ

TYPE: Integer Numeric Array

FIG. 6

DEFAULT CONTROL WORDS TABLE

DCW COL

| DCW ROW | | | | | | | | | | | | | | | |
|---|---|---|---|---|---|---|---|---|---|---|---|---|---|---|---|
| 1 | 0 | 0 | 7 | 3 | 3 | 5 | 0 | 0 | 1 | 0 | ... | | 1 | 2 | 3 |
| 2 | 6 | 5 | 3 | 2 | 0 | 1 | 4 | 8 | 8 | 4 | ... | | 8 | 8 | 7 |
| ... | | | | | | | | | | | | | | | |
| 100 | 0 | 0 | 2 | 5 | 4 | 8 | 7 | 0 | 1 | 0 | ... | | 6 | 5 | 4 |
| | 1 | 2 | 3 | 4 | 5 | 6 | 7 | 8 | 9 | 10 | | | 42 | 43 | 44 |

MODE — 1,2,3
CONTROL WORD — 4–10 ... 42,43
PRIORITY — 44

TYPE: String Array

FIG. 7

CHAIN RULE BUFFER

CHAIN-COL

| CHAIN-ROW | 1 | 2 | 3 | 4 |
|---|---|---|---|---|
| 1 | 5 | 1 | 20 | 3 |
| 2 | 6 | 2 | 10 | 7 |
| ... | | | | |
| 10 | | | | |

RESOURCE NUMBER — col 1
USE INDICATOR — col 2
POOL ROW — col 3
POOL COLUMN — col 4

TYPE: Integer Numeric Array

METHOD FOR MANAGING REDUNDANT RESOURCES IN A COMPLEX AVIONICS COMMUNICATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to avionics systems onboard aircraft and more particularly to a digital computer driven system for controlling and operating a complex, modular avionics system.

Large military aircraft such as the Navy's E2-C or P3-C usually require many radio transmitter/receivers (transceivers) operating in different frequency bands. Each radio transceiver is typically used for one or possibly two functions such as UHF frequency shift keyed data reception/transmission, UHF AM voice transmission/reception, high frequency (HF) single side band voice transmission/reception, or HF digital data reception/transmission. Most of the radio gear is special purpose and each set requires one-of-a-kind packaging, control boxes, electrical interfaces, and antennas. In complex equipment configurations, integration of new equipment is often difficult and costly due to lack of compatability.

As military threats to communication, navigation, and identification (CNI) systems increase in capability, newer, more sophisticated systems must be built in order to ensure successful missions. These new systems require new CNI equipment having new modes of operation. However, an aircraft outfitted with the new equipment would still be required to perform old functions since all of the fleet could not make the transition to the new system simultaneously. It is very difficult, therefore, to introduce new functional capability since all the new equipment and the old equipment cannot fit within the weight and space budgets of the aircraft in question.

Older, specialized mission aircraft having special purpose CNI functions are being replaced by multi-mission aircraft having a mix of old and new CNI functions. The multi-mission aircraft concept requires modular, multi-purpose avionics with sufficient capability to handle the needs of the various missions. These future avionics systems must be capable of simple and rapid reconfiguration. Implicit in the requirements for such an avionics system are such criteria as minimal manual interaction, adaptability to changing avionics hardware, and flexibility for expansion or contraction of the avionics systems.

SUMMARY OF THE INVENTION

Accordingly, one object of this invention is to configure a set of programmable RF signal processing resources to perform desired radio transmission/reception functions.

Another object of this invention is to maintain a data base defining the current configuration status of all components of a complex avionics system.

A further object of this invention is to provide easily executable management of a complex avionics system of the type comprising a plurality of redundant, programmable signal processing resources.

A still further object of this invention is to provide rapid reconfiguration of radio communication, navigation, and identification functions by a human operator as mission requirements change.

The above and other objects are realized in a Tactical Information Exchange System (TIES) for processing communication, navigation, and identification (CNI) signals and messages. TIES uses multipurpose, programmable modules with electrical interfaces which may be interconnected and tuned to provide a variety of CNI functions.

TIES is a computer based system for managing the plurality of programmable modules which make up the system hardware. An executive computer is programmed with a data base defining the various system resources and their status. Software is also provided for changing resource status and control parameters. Typical parameters which may be adjusted include receive and transmit modes, frequency, volume control, gain control, radio mode selection, mode priority, etc.

A major component of the TIES executive software, a reconfiguration routine, enables a system operator to manipulate and modify the resource data base from which the hardwired system configurations are determined. The system operator need only key in the desired mode or modes of operation, or modifications thereto, and the computer executes the necessary data base changes, resource interconnections, and parameter settings.

The process defined by the reconfiguration software, described below in greater detail, in conjunction with the TIES data base and modular hardware concept provides a novel method for operating CNI equipment in a complex avionics system. Other advantages and novel features of the invention will become apparent from the detailed description of the invention which follows the drawings wherein:

BRIEF DESCRIPTION OF THE DRAWINGS

FIG. 2 is a symbolic representation of a chain rule as used in the invention.

FIG. 3A and 3B are representations of a three level, two-dimensional data file called Pool Table which is part of the TIES data base.

FIG. 4 is a representation of a two dimensional data base file called the Resource Data Table.

FIG. 5 is a representation of a two dimensional data base file called the Active Modes Table.

FIG. 6. is a representation of a two dimensional data base file called the Default Control Words Table.

FIG. 7 is a representation of a two dimensional data base file called the Chain Rule Buffer.

DESCRIPTION OF THE PREFERRED EMBODIMENT

Figure 1:
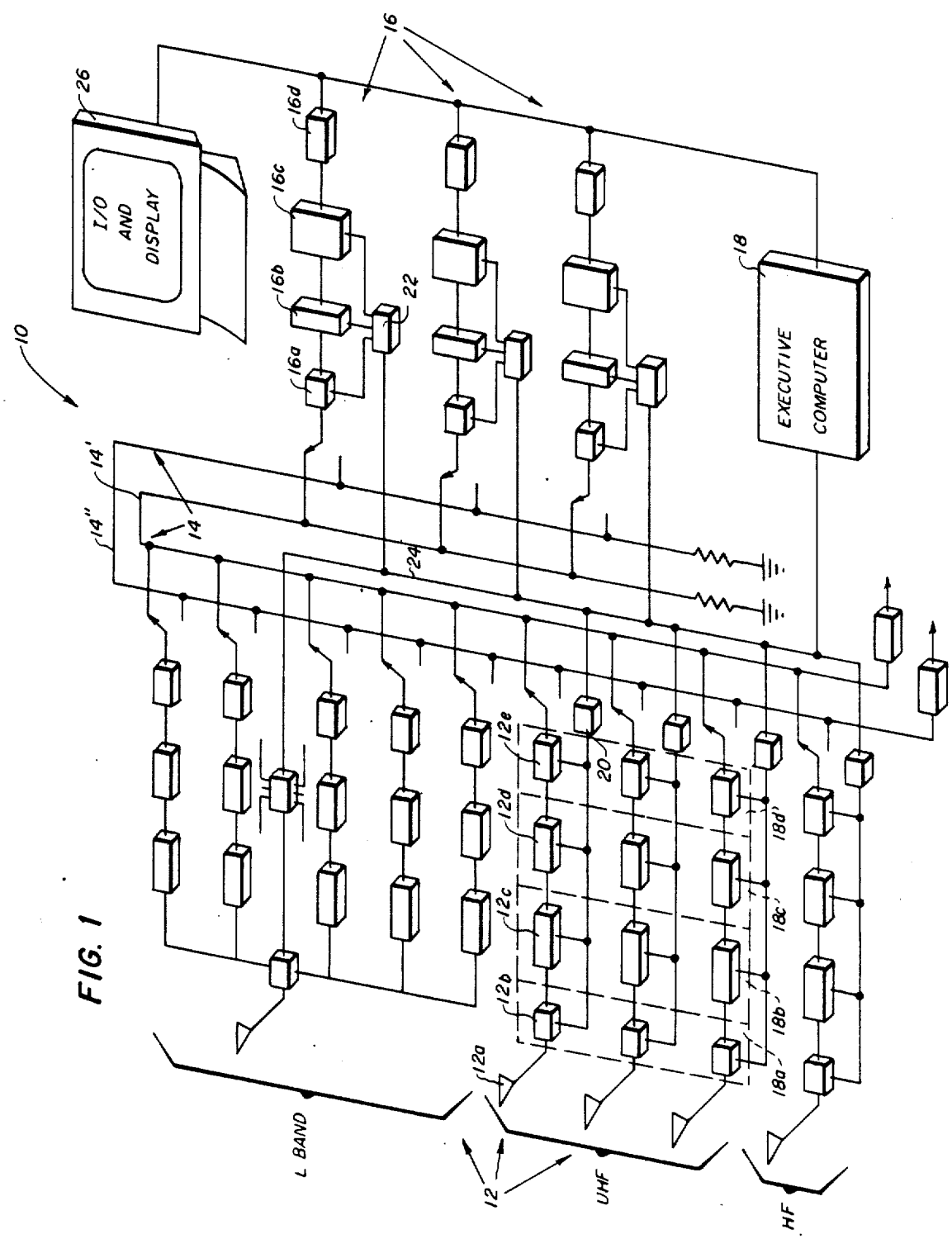
FIG. 1 shows a schematic representation of a TIES system according to the invention.

Referring now to the drawings wherein like reference numerals indicate identical or similar components among the several views, and in particular to FIG. 1, there is shown a schematic representation of a Tactical Information Exchange System (TIES) 10 according to the invention. The TIES 10 is structured in such a way that any one of a number of resources can process any one of a number of signals.

For example, the TIES 10 can be broken down into three general subsystems: a frequency conversion subsystem 12, a signal distribution subsystem 14, and a signal conversion subsystem 16. Each of the subsystems 12, 14, and 16 contain a plurality of resources each of which performs a different signal processing function. These resources may be interconnected to form specialized signal processing entities.

As shown in FIG. 1, a UHF antenna 12a has been linked to a UHF front end module 12b, a mixer 12c, an IF strip 12d, and an on-bus converter/coupler 12e. This particular series of resources could be capable of receiving UHF AM signals.

Frequency division multiplex buses 14a and 14b are provided for transmitting the signals from a frequency conversion group 12 to a signal conversion group 16. Such a signal conversion group could consist of an off-bus converter/coupler 16a, and various voice, digital, and data processors 16b-d.

The TIES 10 is controlled and operated by an executive computer 18 which supervises a plurality of remote microprocessors 20, 22, each of which in turn controls a set of resources. The executive computer 18 communicates with various remote microprocessors 20, 22 through a data bus 24. Access to the system 10 is through some type of input/output display terminal 26, such as a CRT with keyboard.

The TIES achieves flexibility and diversity of signal processing through software which manages a plurality of resource pools 28a-d. A resource pool is a collection of resources able to perform the same signal processing task. In other words all of the resources (modules) in pool 28a perform the same type of signal processing function. Likewise, the same would be true of the resources in each of pools 28b-d. Moreover, the resources in each pool may be interconnected with any resource for another related pool.

In the TIES concept the word "mode" applies to functional signal processing capability. Procedures for simple mode choice with at least the simplicity of conventional transceivers, but with much more flexibility are designed into the TIES software. For example, AM reception in the ultra high frequency (UHF) band is a mode in TIES. For the TIES system to implement this mode the following resources would be required: a UHF antenna, a UHF receiver front end including a transmit/receive switch and mixer, a synthesizer tuned to the correct channel, an IF strip, a receive bus frequency assignment, and a Narrowband Signal Conversion Unit programmed for AM reception.

Modes may be grouped by band and by type. There are both transmit and receive modes in the high frequency (HF), UHF, very high frequency (VHF), and Lx bands. Some typical modes in HF would include: single side band (SSB), differentially coherent phase shift keying (DCPSK), continuous wave keying (CWK), and frequency shift keying (FSK). Some typical modes for VHF or UHF are: AM, FM, FSK, and slow frequency hopping. Typical modes on the Lx band include: tactical air navigation (TACAN), identification friend or foe (IFF), and joint tactical information distribution (JTIDS). It is apparent that the TIES has a significant amount of signal processing capability.

Fundamental to the TIES method of signal processing management are the concepts of resource pools and chain rules. Resource pools have already been described. A chain rule is a specification of pool linking necessary to accomplish the signal processing for a particular mode. A chain rule represents all possible resource linkings that can accomplish a particular mode.

Figures 2, 3A:
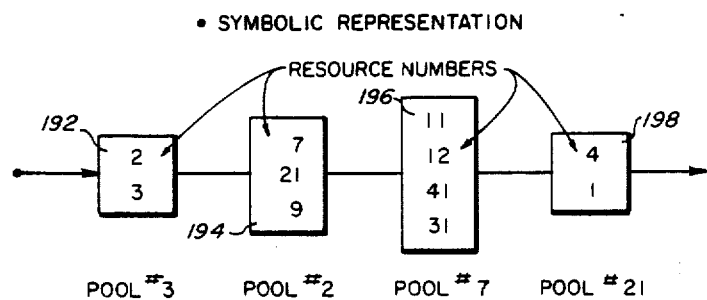

FIG. 2 gives a symbolic representation of the chain rule concept. The mode in this representation will be assumed to be UHF AM receive. Four pools of resources 192, 194, 196, and 198 are involved. Pool #3, 192, would represent UHF antennas. There are two antennas (resources) in pool #3, 192, resource 2 and resource 3. Pool #2, 194, represents a transmit/receive switch (T/R) and UHF receiver front end. There are three T/R - UHF receiver front end modules. Their numbers are 7, 21, and 9. Pool #7, 196, represents Narrowband Signal Conversion Units. There are four resources labeled 11, 12, 41, and 31 that can each provide the necessary processing for AM receive in UHF. Finally, the chain rule includes pool #21, 198, which contains two data processors (resources 4 and 1) able to provide the final signal processing for the input/output devices for this mode.

One of the "solutions" specified by the chain rule is: 2-7-11-4. This means that if the resources 2, 7, 11 and 4 are linked together, the UHF AM receive mode can be implemented. Another solution is 3-21-41-1, etc. The chain rule linking is read as: "Any resource from pool #3, AND any resource from pool #2, AND any resource from pool #7, AND any resource from pool #21." Various modes may be preprogrammed using chain rules in this manner. Of course, chain rules may also be manually input as required.

The various modes, resource pools, resources, chain rules, as well as other necessary data are stored in the TIES data base. The data base for TIES is a set of arrays or tables stored in a random access storage device connected to the executive computer. These arrays provide most of the input and output data for the TIES software routines. Some of the arrays are preloaded when the TIES is initially programmed. The arrays vary in size and type. Some are integer, some are string arrays, and some are integer numeric.

In the preferred embodiment of the TIES there are at least twenty-six data tables in the data base. These define the various system hardware components which the software is to control. The data base files most pertinent to the system configuration/reconfiguration software are illustrated in FIGS. 3 to 8. A brief description of each of these data base tables will be given in order to aid understanding of the operation of the system software.

FIGS. 3A and 3B represent an array called the Pool Table. The Pool Table in TIES is a three level set of two dimensional arrays. The first level of the Pool Table lists the resource number of each resource in every pool of resources. The second level of the table contains the status of each of the system resources. Possible status conditions are:
  a. Not in use (available).
  b. Reserved for future use (not available).
  c. In use (not available).
  d. Failed (not available).

The third level of the Pool Table is a wiring key of the resources indicating electrically related resources.

FIG. 4 is a representation of a data base file called the Resource Data Table. The Resource Data Table is a two dimension array which provides information regarding the TIES resources. The table contains the priority of the mode the resource is assigned to, the pool number the resource belongs to, the assignment number the resource is associated with, addressing information, and built-in-test status. The resource number is the row index for the array, and the other inforation is stored in the various columns of each row.

FIG. 5 shows a representation of a data base file called the Active Modes Table. The Active Modes Table is a listing of the current mode assignments for the TIES system. The list is maintained to reflect the current mode assignments in effect, and lists the microprocessor addresses associated with each assignment.

FIG. 6 is a representation of the data file called the Default Control Words Table. The Default Control Words Table contains the control words required to establish all of the modes in TIES automatically, without operator inputs. The table contains as many control words as are necessary to implement each mode. The table is keyed to the hardware it controls by the relative order of each control word in the table. The first control word for a given mode is to be sent to the first set of hardware specified by the first chain rule identifier. This pairing is also recognized when the TIES data base is being created for a particular system.

FIG. 7 is a representation of the data base file called Chain Rule Buffer. The Chain Rule Buffer is a two dimensional numeric array which contains a listing of all of the resources required to implement a mode assignment. The Chain Rule Buffer is generated by the software using chain rule tables, and the available resources in the Pool Table. When a particular resource is chosen to implement a mode, the resource number is placed into the Chain Rule Buffer, and the resource status in the Pool Table is updated to indicate that the resource is being reserved for the current mode. Only after the chain rule is satisfied is the mode in the Chain Rule Buffer considered complete for the current assignment. After the mode has been implemented, the Chain Rule Buffer is emptied in anticipation of the next assignment. It should be noted that the resource status in the Pool Table changes from reserved to in-use when the mode is implemented. A use indicator for each resource is also stored in the Chain Rule Buffer.

Figure 8:
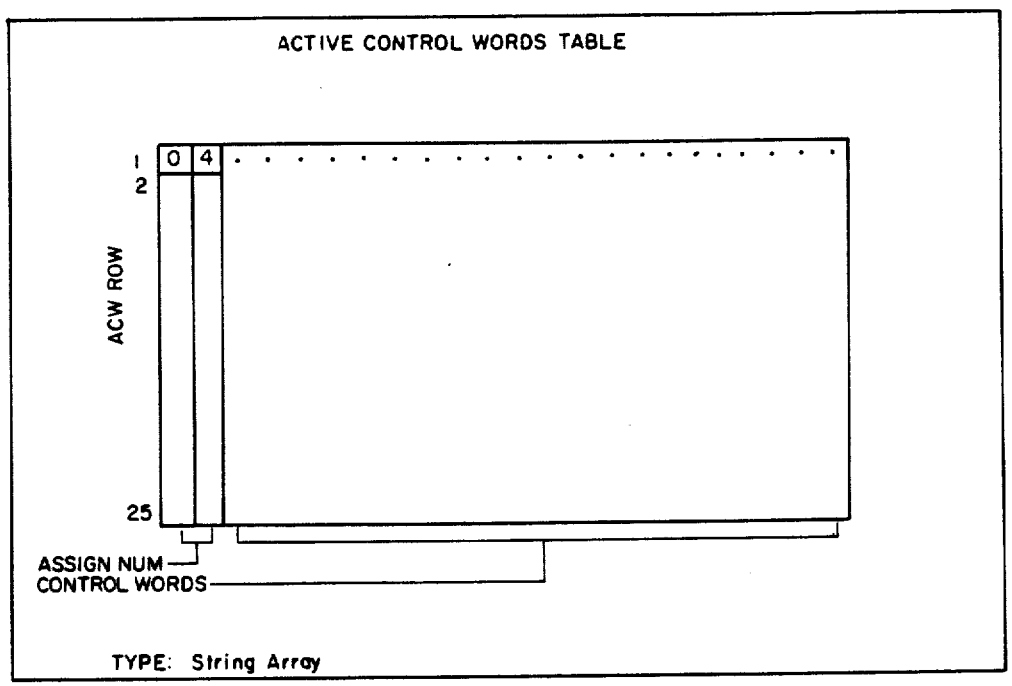
FIG. 8 is a representation of a two dimensional data base file called the Active Control Words Table.

FIG. 8 represents a data base file called Active Control Words Table. The control word strings which have been sent to implement the current CNI modes are stored in the Active Control Words Table. The first two characters of the table contain the assignment number with which the control word is associated and the remainder of the characters contain the control string. The number of control words for a given mode corresponds to the number of microprocessors 20,22 which have to be controlled to implement the mode. The first control string for a particular assignment number is written to the first microprocessor address in the Active Modes Table, and the remainder of the control words are used to control the other microprocessors.

Figure 9:
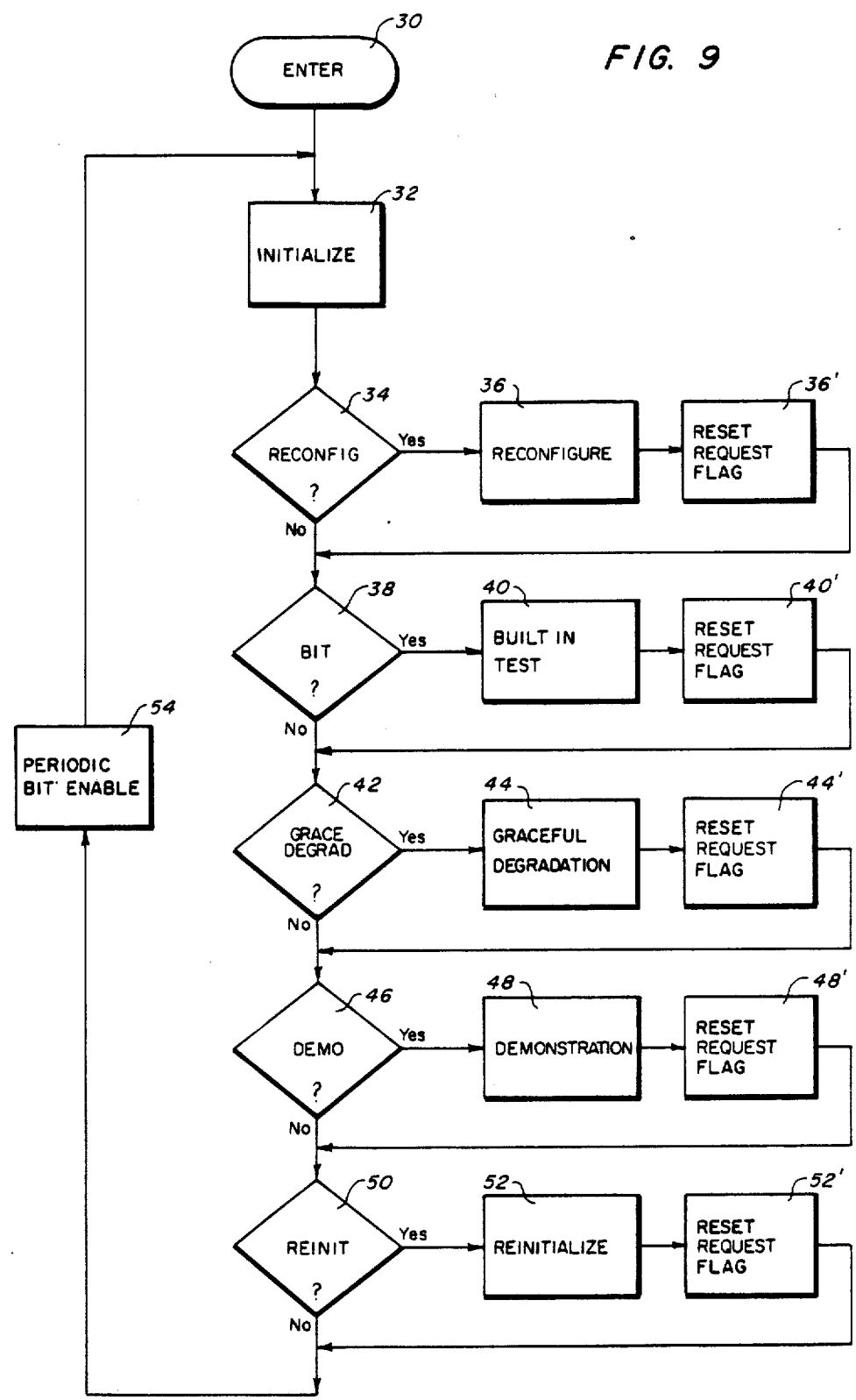
FIG. 9 is a generalized flow diagram of the TIES main executive software according to the invention.

Referring now to FIG. 9 there is shown a flow diagram of the TIES overall executive software. The main program loops through the decision nodes 34, 38, 42, 46, and 50. At the node labeled 54 in the diagram, a counter times the number of loops since the previous built-in-test (BIT). When an appropriate time interval has passed, a flag is set at decision node 38. An escape to any one of the other routines at nodes 34, 38, 42, 46, and 50 is provided by setting the appropriate flag reset request 36', 40', 44', 48', and 52'.

Certain sections of some of the routines must not be interrupted by the user. Therefore, these sections are provided with protection in the form of subroutines which disable the input devices during a critical execution. An example of this situation involves the Built-in-Test (BIT) module 40. Occasionally during execution of this routine it becomes necessary to borrow resources from some signal processing task so that a test may be implemented. It would be very troublesome to interrupt the BIT routine 40 after resource borrowing had occurred in order to replace some other function by using the Reconfigure module 36.

Upon system startup, the Initialize module 32 provides the user/operator with a choice of either automatic or manual set-up of the TIES. In the automatic set-up a set of default or preprogrammed modes are implemented.

Figure 10:
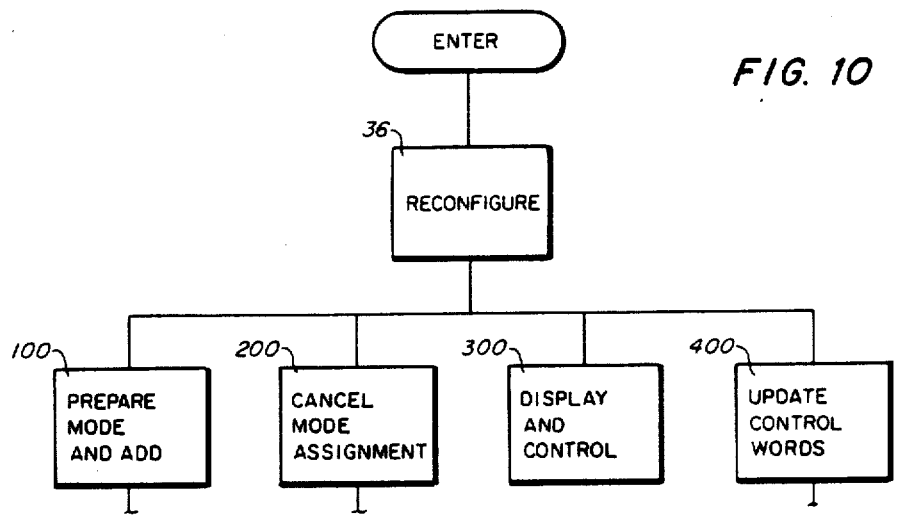
FIG. 10 is a hierarchy chart of the principal software routines called by the Reconfigure software module according to the invention.

Once the TIES has been initialized, the operator/user may reconfigure the system by adding new modes, deleting existing modes, or modifying existing modes. All of these tasks are accomplished through the software in the Reconfigure module 36. FIG. 10 shows a simplified hierarchy chart for the Reconfigure module 36. The module 36 has at least four routines: Prepare Mode and Add 100, Cancel Mode Assignment 200, Display and Control 300, and Update Control Words 400.

Figure 11:
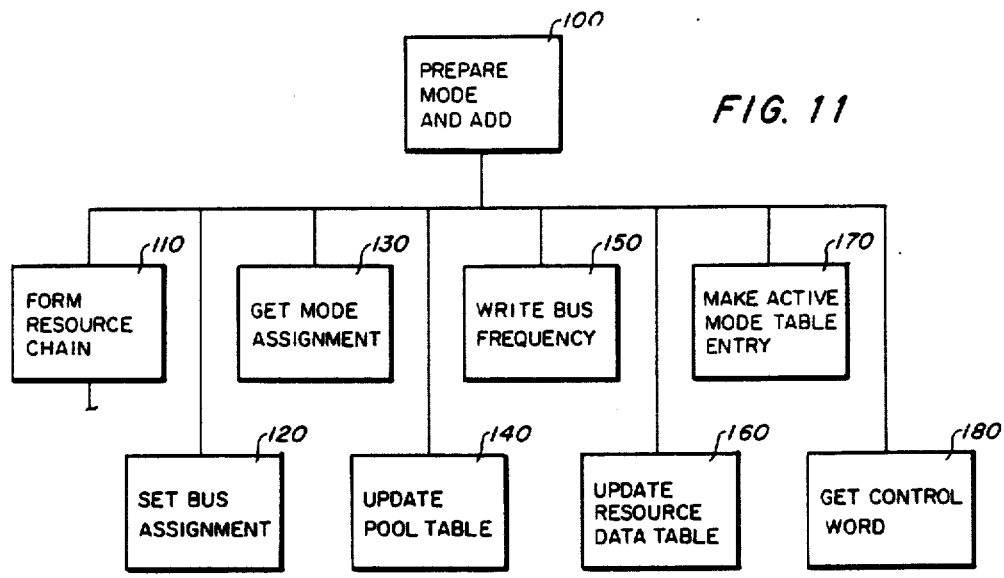
FIG. 11 is a hierarchy chart of the principal subroutines called by the Prepare Mode and Add routine of FIG. 10.

The first routine, Prepare Mode and Add 100, itself has a hierarchy of subroutines as shown in FIG. 11. In this part of the Reconfigure module 36, the user/operator may add a mode to the current Active Mode Table (see FIG. 5). A scrolling menu of available modes is displayed to the user on the input/output device 26. The user then chooses a desired mode by keying in the appropriate mode number. The chain rule for the requested mode is generated by the software and sent to a subroutine which interprets the rule.

The chain rule interpreter checks each required pool to see if any member resource is available for commitment to the assigned mode. If the chain rule process is successful, a chain rule buffer is output with the contents representing the resources to be used. The new mode is then implemented and an appropriate acknowledgment displayed. If the chain rule process fails, then a message explaining the failure is output.

Figure 12:
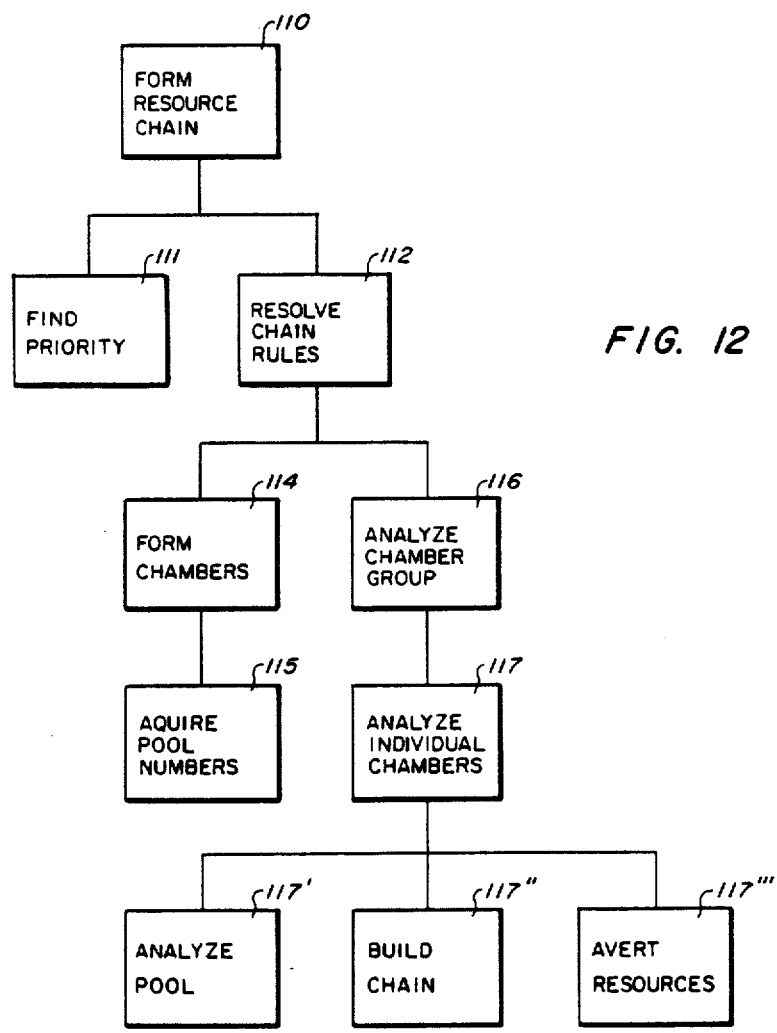
FIG. 12 is a hierarchy chart of the principal subsubroutines called by the Form Resource Chain subroutine of FIG. 11.

More specifically, the Prepare Mode and Add routine 100 calls subroutines Form Resource Chain 110, Set Bus Assignment 120, Get Active Mode Table Assignment 130, Update Pool Table 140, Write Bus Frequency 150, Update Resource Data Table 160, Active Mode Table entry 170, and Control Word Fetch 180. The Form Resource Chain subroutine 110 accepts the mode number as input and outputs a chain rule conforming thereto. As shown in FIG. 12 Form Resource Chain subroutine 110 involves a number of sub-subroutines to determine the requisite chain-rule.

In particular, sub-subroutine Resolve Chain Rules 112 chooses a set of physical resources which can be interconnected to implement a given chain rule. The sub-subroutine then writes the resource numbers to the Chain Rule Buffer, FIG. 7. In order to accomplish this sub-subroutine 112 calls two other sub-subroutines: Form Chambers 114 and Analyze Chamber Group 116.

Form Chambers 114 reads the chain rule and breaks it down into units referred to as chambers. Form Chambers 114 then calls sub-subroutine Acquire Pool Members 115 which scans each chamber for a pool number and sends the pool number back to Form Chambers 114. In this manner, the required pool numbers to provide the required resources are determined.

Sub-subroutine Analyze Chamber Group 116 analyzes each chamber identified by Form Chambers 114. To do this, Analyze Chamber Group 116 calls the sub-subroutine Analyze Individual Chambers 117 which examines each chamber for resource requirements on a pool by pool basis. In the process of accomplishing this analysis Analyze Individual Chambers 117 calls on sub-subroutine Analyze Pool 117' which scans each identified pool for each chamber and obtains a resource number. Build Chain 117" writes the resource numbers found by Analyze Pool 117' to the Chain Rule Buffer. Avert Resources 117''' is provided to keep track of resources which are committed to an exclusive interconnection so that use of these resources will be averted by later modes.

An example of the operation of these sub-subroutines may be illustrated by referring back to FIG. 2, wherein is shown a symbolic representation of a chain rule 190. Each one of the blocks 192-198 shown in the symbolic representation may be considered a chamber. The sub-subroutine Form Chambers 114 breaks out each of the chambers 192-198 from the given chain rule 190. The sub-subroutine Acquire Pool Numbers 115 obtains the associated pool number from each of the chambers 192-198. For instance, Chamber 192 relates to pool number 3. Form Chambers 114 is an iterative subroutine in that it performs the same task for each chamber identified in the chain rule.

The sub-subroutine Analyze Chamber Group 116 reads the chamber and pool information obtained by Form Chambers 114. When sub-subroutine Analyze Individual Chambers 117 is called it examines each of the chambers 192-198 on a pool by pool basis to obtain the necessary resources. For instance, sub-subroutine 117 would determine that chamber 194 requires a resource or resources from pool number 2.

Sub-subroutine Analyze Pool 117' would then be called for each pool so determined. Analyze Pool 117' selects a resource number, for example resource number 7 from pool number 2. As resource numbers for each chamber are selected from each pool, they are read to sub-subroutine Build Chain 117" which writes the resource numbers to the Chain Rule Buffer, FIG. 7. The chain of chosen resources may then be implemented for use.

Referring back now to FIG. 11, the subroutine Set Bus Assignment 120 obtains an available bus frequency for use by the newly added mode on the multiplex bus 14' of the signal distribution system 14. The selected bus frequency is then placed in the Resource Data Table, FIG. 4.

Subroutine Get Mode Assignment 130 obtains the next available assignment number and writes the control word field for the new mode into the Active Mode Table, FIG. 5. Subroutine Update Pool Table 140 updates the data in the Pool Table, FIGS. 3A & 3B, by setting those resource numbers chosen for a new assignment to the "used" state.

Subroutine Write Bus Frequency 150 writes the multiplex bus frequency selected by Set Bus Assignment 120 into the Active Control Words Table, FIG. 8. Subroutine Update Resource Data Table 160 writes the assignment number of the new mode into the appropriate row of the Resource Data Table, FIG. 4.

Subroutine Make Active Mode Table Entry 170 reads the control data and microprocessor address of the newly assigned mode from the Default Control Words Table, FIG. 6 and writes the address to the Active Control Words Table, FIG. 8. Subroutine Get Control Word 180, reads the Chain Rule Buffer, FIG. 7 to obtain the Use Indicator (col. 2) (e.g. available, reserved, in use, etc.). Once this information has been obtained, subroutine 180 fetches the correct default control words from the Default Control Words Table, FIG. 6.

Referring back to FIG. 10, the second major part of the Reconfigure module 36 is the Cancel Mode Assignment Routine 200. In this case, the software operates to update the various data base tables to reflect the changed status of resources which were previously used to implement a since-cancelled mode. The Active Modes Table is updated by deleting the assignment number of the cancelled mode and compressing the data table. The Resource Data Table is updated by searching the assignment number column for the mode assignment number of the cancelled mode. Each time the appropriate assignment number is identified, the pool column number is obtained for that resource. This is the address of the pool in the Pool Table to which the resource belongs. Thus the Pool Table also can be appropriately updated with regard to the status of the various resources used in the cancelled mode.

Figure 13:
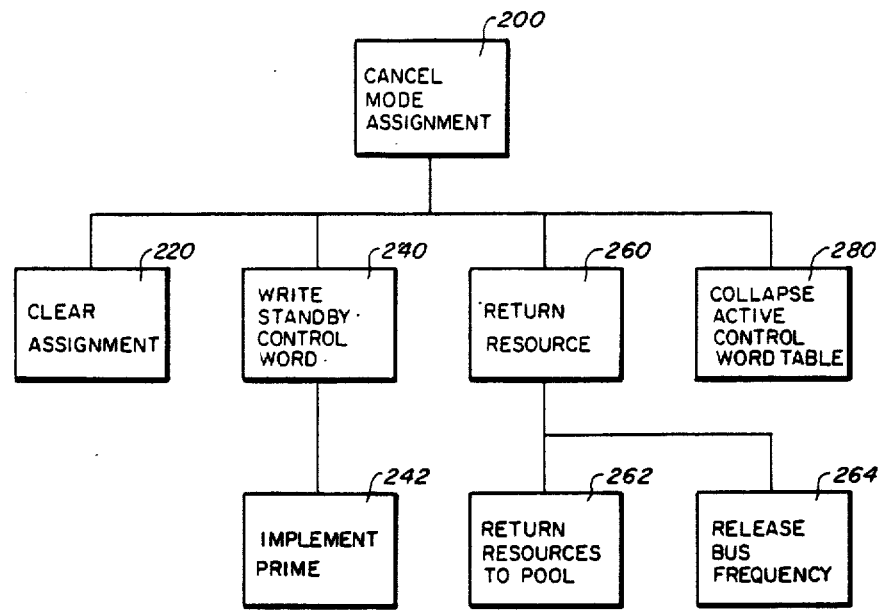
FIG. 13 is a hierarchy chart of the principal subroutines called by the Cancel Mode Assignment routine of FIG. 10.
Figure 14:
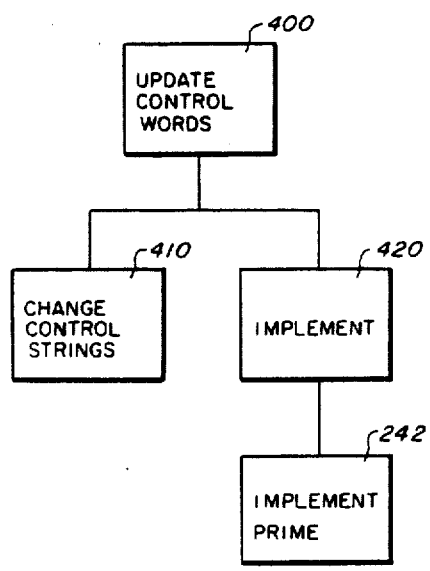
FIG. 14 is a hierarchy chart of the principal subroutines called by the routine Update Control Words of FIG. 10.

More specifically, and as shown in FIG. 13 routine 200, Cancel Mode Assignment, calls subroutine 220, Clear Assignment, which clears the desired mode assignment from the Active Mode Table. Cancel Mode Assignment 200 also calls subroutine 240 Write Standby Control Word which implements a standby mode assignment, the ambient or normal status of the resources used in the cancelled mode assignment. To do this Write Standby Control Word 240 finds the standby mode number from the Microprocessor to Standby Mode Table, a data file which is a compilation of the modes which place each microprocessor 20 in a standby mode. Subroutine 240 then finds the appropriate standby control word from the Default Control Words Table, FIG. 6. Upon obtaining the appropriate standby control word, subroutine 240 calls sub-subroutine 242, Implement Prime, which outputs the control word to the particular microprocessor 20 controlling the resources for the cancelled mode assignment.

Routine 200 then calls subroutine 260, Return Resources, which updates the Pool Table and bus frequency assignment files. These bus frequency assignment files list the various bus frequencies assigned to the active modes. There may be separate files for the transmitting and receiving buses. In this manner the formerly used resources are made available in the Pool Table and the formerly assigned multiplex bus frequencies are made available for use by other mode assignments.

Finally, subroutine 280 compresses the Active Mode Table by filling the row or rows vacated by the cancelled mode or modes. In this way, efficient use of data storage is always made.

The third main part of Reconfigure module 36 is routine 300, Display and Control. The Display and Control routine 300 provides formatting and output of system information and messages. It also allows the operator to examine stored data fields either at high or low level. The Display and Control routine 300 provides interactive processing for the operator to update various system data.

The fourth main part of the Reconfigure module 36 is routine 400, Update Control Words. This routine allows the operator to update the control words for a particular assignment number. The assignment number is then implemented using the updated control words.

More specifically, routine 400 accepts an assignment number from the operator and finds the appropriate control word from the Active Control Words Table. Routine 400 then updates all of the data strings based on changes supplied interactively by the operator. Routine 300, Display and Control, is utilized to request the desired updates from the operator.

When the updates have been input, routine 400 calls subroutine 420, Implement, which separates control word and address information from the data strings and establishes a current mode assignment number. Subroutine 420 then calls sub-subroutine 242, Implement Prime, which outputs the updated control word to the particular microprocessor 20 controlling the resources for the current mode assignment. In this manner particular characteristics of an assigned mode (e.g. transmit or receive frequency, bus frequency, etc.) may be updated without having to cancel the current mode and add a new mode.

A special function is available within routine 400 for automatically switching between transmit and receive operations for a given mode assignment. In this case the operator need only depress the transmit button on the transceiver microphone and Update Control Words 400 automatically switches the control word strings from receive to transmit modes by means of subroutine 410, Change Control Strings. Subroutine 410 associates transmit/receive pairs in the data base tables, as well as the appropriate control strings in the Active Control Words Table. In this manner it is possible to rapidly switch from receive to transmit for a given receive mode without having to cancel the receive mode or make a new transmit assignment manually.

Additional software modules, though not shown, may be included to provide additional functions. For example, an Update Priorities routine may be used to update the priority numbers of active modes. The Update Priorities module would be essentially an editing routine, like Update Control Words 400. It would allow the user/operator to change the priority of one or more modes by editing the mode priority numbers in the Resource Data Table and the Active Mode Table.

A Force Resource Assignment routine could be used to enable the operator to assign particular pieces of hardware to a given mode, or to designate specific multiplex bus channel assignments using particular frequencies.

A clearer understanding of the easiness and utility of the invention may be had by referring to FIGS. 1 and 15A-15D in conjunction with the following example of the operation of the reconfiguration process. The operator first initiates a run command on the input/output terminal 26 whereby the TIES executive software initializes the executive computer 18, reads the data base from some peripheral storage device, and establishes the display shown in FIG. 15A. The prompt at the bottom of the display instructs the operator to push a special function key to select the control function desired. The special function keys are labeled K0 to K12.

Figure 15A:
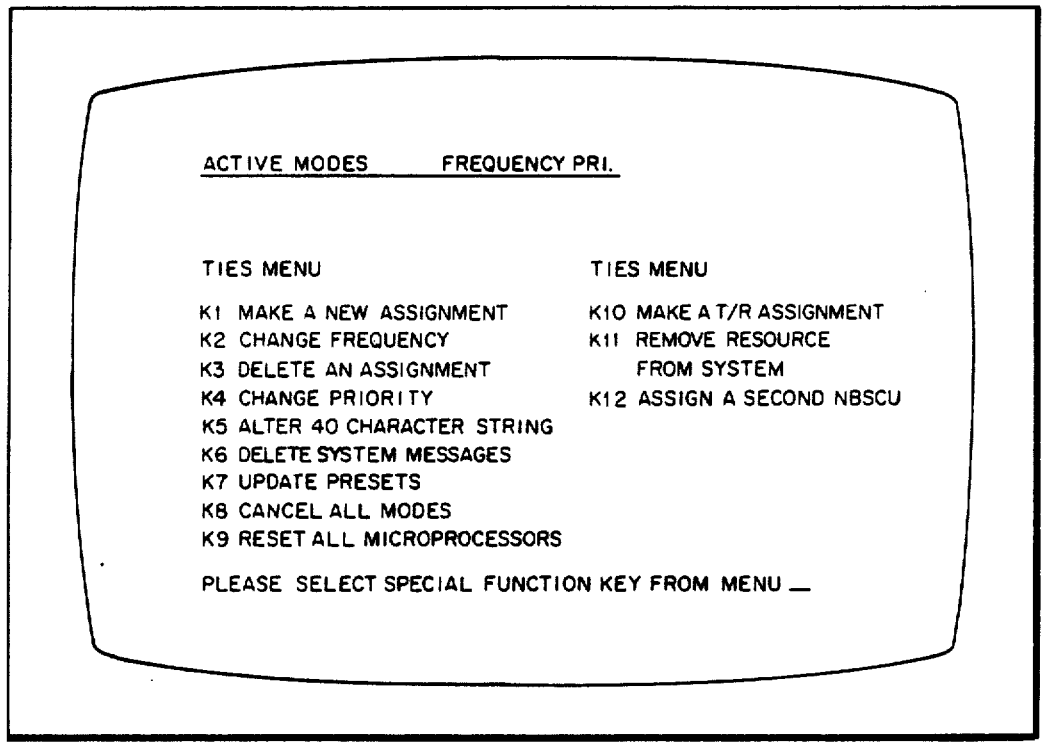
FIG. 15A-15D are representations of data output displayed during operation of a TIES system according to the invention.
Figure 15B:
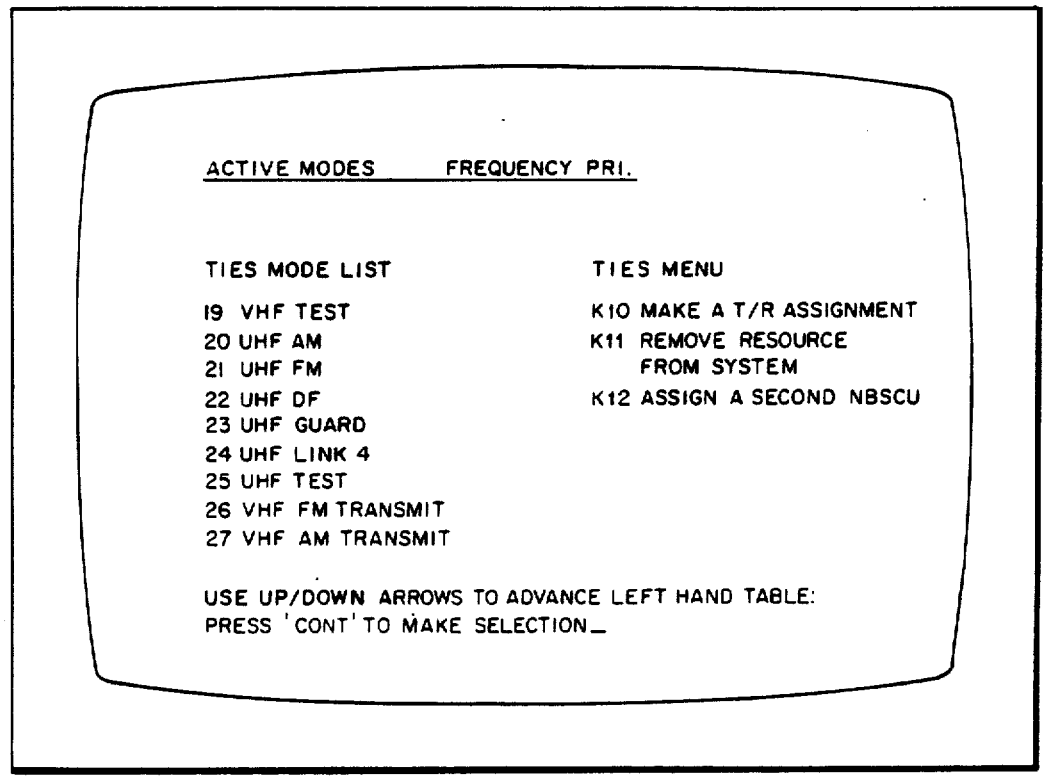
Figure 15C:
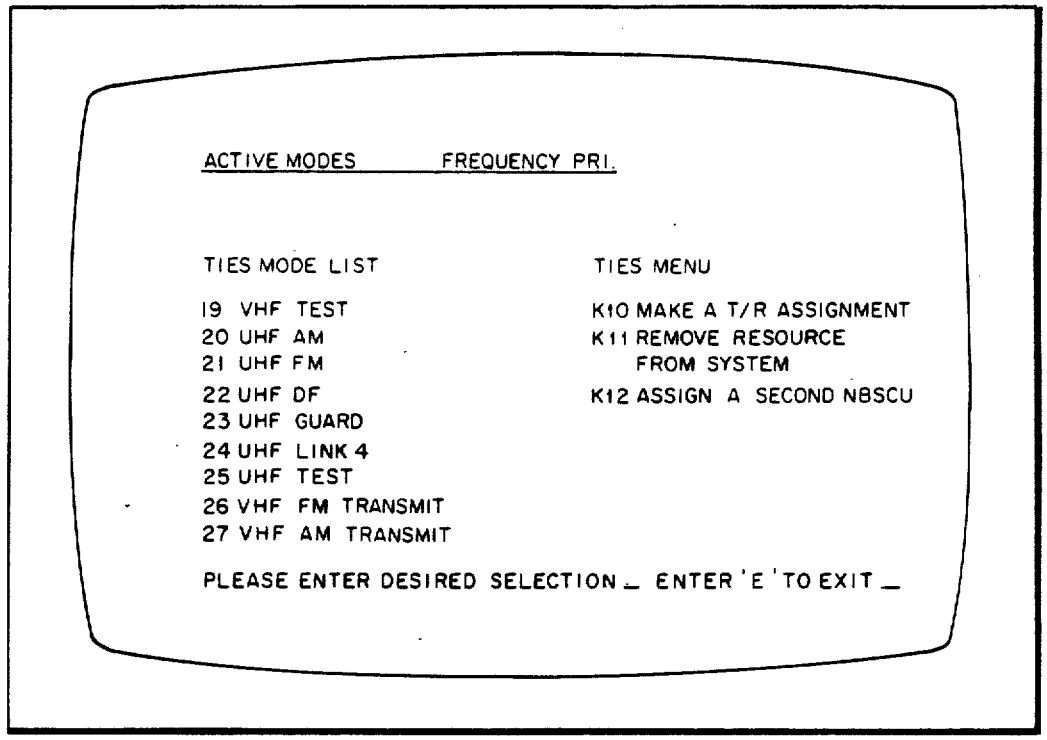

Suppose, for example, that it is desired to make a transmitter/receiver pair assignment. The operator would then press the K10 key whereupon the display would change to indicate a list of the TIES functional modes. The list may be scrolled up or down. FIG. 15B shows the display after the TIES Mode List has been twice scrolled up. The operator is prompted to press the Continue key if he wishes to make a mode selection. Upon doing so, the display changes to that shown in FIG. 15C. The operator is now requested to select a desired mode or function number.

Figure 15D:
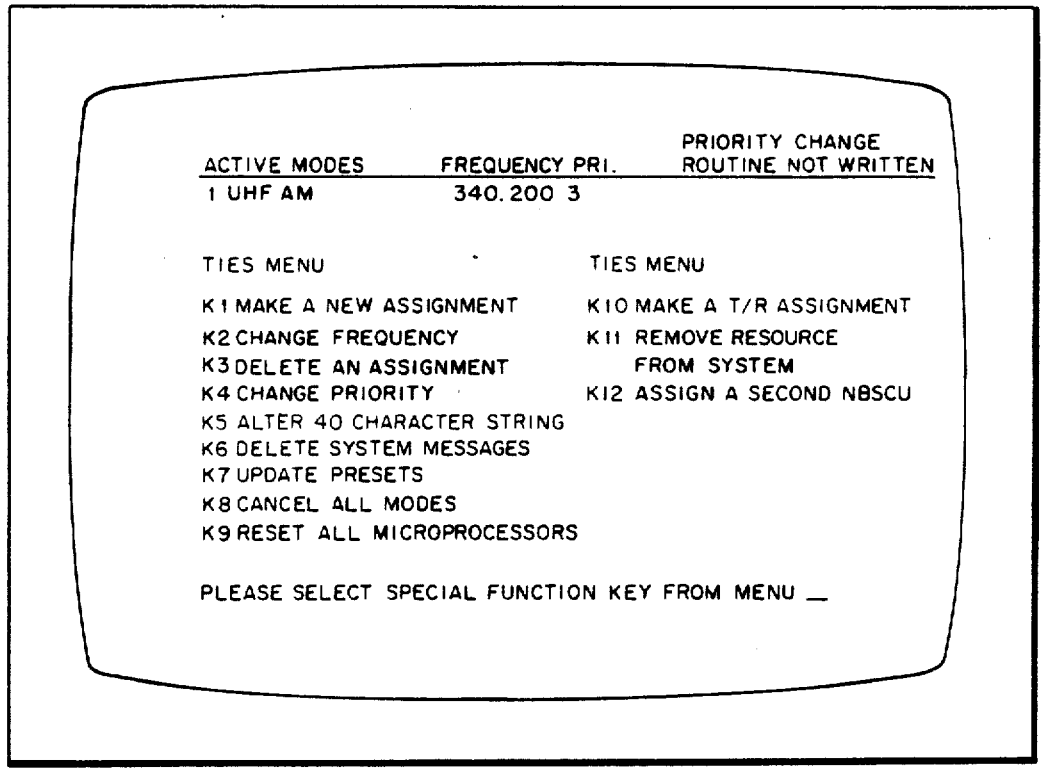

If it is desired to establish a UHF AM transceive capability, then the operator would enter mode number 20. After a period of time for computation and implementation the display returns to the main menu as shown in FIG. 15D. Now, however, the system status section in the upper left quadrant has been updated to indicate that a mode assignment number 1 has been implemented which is providing a UHF AM capability at 340.2 MHz and having a priority number of 3.

At this point other frequencies may be selected for any assignment number after pressing special function key K2. An assignment may be deleted from the system and the hardware returned to standby mode, key K3. All of the current assignments may be deleted, key K8, or the frequencies may be changed, key K7. Of course, other assignments may be added after pressing keys K1 or K10 as described above.

If any of the units operating generates a system message, it would appear in the upper right quadrant. For example in FIG. 15D a system message has been displayed explaining that one of the special function keys, K4, the operator has depressed is not yet operational. Such messages remain in the display until removed by pressing key K6, or until nine other messages are generated, whereupon the oldest message is bumped from the top of the display screen. This assures that the most recent messages will always be available on the display.

Some of the many advantages and novel features of the disclosed invention should now be apparent in view of the foregoing description. For example, a novel method for configuring complex avionics systems has been disclosed. The method is capable of managing a plurality of programmable RF signal processing resources. These resources are thereby configured and reconfigured to perform a variety of signal processing functions for communication, navigation and identification. Moreover, since the reconfiguration process is computer based, a single operator can manage a plurality of resources by simply keying in data to the computer.

Numerous modifications and variations of the subject invention are possible in view of the above disclosure. It is to be understood therefore, that within the scope of the appended claims, the invention may be practiced otherwise than as specifically described herein.

What is claimed is:

1. In an avionics system of the type having a plurality of resources, a method utilizing a general purpose computer for configuring the resources in selected signal processing modes for performing different communication, navigation, and identification functions, comprising the steps of:
   outputting a menu of the functions previously stored in the computer;
   receiving a first signal indicative of a selected one of the functions;
   outputting a list of possible ones of the modes in response to said first signal, said modes having been previously stored in the computer;
   receiving a second signal indicative of selected ones of the modes;
   processing said second signal to determine the required resources and their modes, said processing step comprising:
      selecting appropriate specifications for resource linking to construct the desired modes from a table of specifications previously storeed in the computer;
      checking a plurality of resource pools previously stored in the computer to determine the availability/ of each resource required to accomplish the selected specifications;
      assigning available resources from each of the resource pools to respective modes;
      determining that one or more of the resource are not presently availabel to implement a desired mode;
      comparing a previously assigned priority value of the mode indicated by the current second signal to the priority values of modes already implemented;
      determining whether the currently requested mode has a higher priority than any of the existing modes;
      reassigning one of the resources to the currently requested mode when said currently requested mode has a higher priority than at least one of the existing modes; and
      outputting a message indicative of said resource reassignment if made, or if not made due to an absence of resources necessary accomplish the currently requested mode;
   implementing the selected modes by appropriately interconnecting the required resources activating them, and tuning each of the selected modes to an appropriate frequency;
   updating information in a previously stored resource data table concerning the status of the resources used to activate the selected modes; and
   generating a table of the activated modes.

2. A method as recited in claim 1 further comprising the steps of:
   receiving a third signal indicating cancellation of one or more activated modes;
   deactivating the cancelled modes;
   updating the resource data table concerning the deactivated status of resources used in the cancelled modes;
   returning the deactivated resources to an available status in the resource pools; and
   updating the table of activated resource configuration modes to delete the cancelled modes.

3. A method as recited in claim 2 further comprising the steps of:
   receiving signals indicative of a change to one or more of the activated modes;
   updating information in a previously stored active control word table according to the change signals; and
   implementing changes to the respective modes in accordance with the updated active control word table.

4. A method as recited in claim 3 wherein the step of receiving the change signals comprises the steps of:
   receiving a fourth signal indicative of a mode assignment number; and
   interactively receiving a fifth signal indicating the changes to be made to the mode corresponding to the mode assignment number.

5. A method as recited in claim 4 wherein the step of updating the active control word table comprises the steps of:
   finding a control word data field corresponding to the mode assignment number; and
   changing a portion of the control word data field according to the changes indicated on said fifth signal.

6. A method as recited in claim 3 further comprising the steps of:
   receiving a signal indicating a change in priority of the activated modes; and
   updating the resource data table and the table of activated modes to indicate the changed priorities.

7. In a complex avionics system of the type having a plurality of resources, apparatus for configurating the resources in selected signal processing modes for performing different communication, navigation, and identification, functions, comprising:
   functional mode data file means for storing a table of obtainable signal processing modes;
   display means for outputting a list of the obtainable signal processing modes from said functional mode data file means;
   manual entry means for inputting a signal processing mode selection;
   data storage and processing means responsive to said manual entry means for determining the signal processing resources required to configure the selected signal processing mode, said data storage and processing means comprising:
      resource linking data file means for storing a table of specifications for linking of the resources to construct the obtainable modes;
      resource pool data file means for storing information on the identification and availability of the resources;
      means for selecting a linking specification from said resource linking data file means appropriate for constructing the selected mode;
      means rsponsive to said specification selecting means for assigning avaialble resources from said resource pool data file means to be implemented for the selected mode;
      means for determining that one or more resources are not available to implement the selected mode;

means for comparing a previously assigned priority value of the selected mode to priority values of the modes already implemented;

means for reassigning a resource to the selected mode from an existing mode having a lower priority; and display means for outputting a message indicative of said resource reassignment if made, or if not made due to the unavailability of resources to accomplish the selected mode;

means responsive to said data storage and processing means for implementing the selected mode;

means responsive to said implementing means for generating, storing, and displaying a table of the implemented modes;

resource data table storage means for storing data concerning the status of resources used to implement the selected mode; and means responsive to said implementing means for updating said resource data table storage means and said resource pool data file means.

8. A system as recited in claim 7 wherein:

said manual entry means further comprises means for inputting a signal processing mode cancellation;

said data storage and processing means further comprises means for deactivating the cancelled signal processing mode; and said reconfiguration system further comprises means for updating the table of implemented signal processing modes to delete the cancelled mode.

* * * * *